United States Patent
Ye et al.

(10) Patent No.: US 7,899,330 B2
(45) Date of Patent: Mar. 1, 2011

(54) COMPACT HIGH-RESOLUTION TUNABLE OPTICAL FILTER USING OPTICAL DIFFRACTION ELEMENT AND A MIRROR

(75) Inventors: Feng Ye, Alameda, CA (US); Ho-Shang Lee, El Sobrante, CA (US); Robert Schleicher, Danville, CA (US)

(73) Assignee: Dicon Fiberoptics, Inc., Richmond, CA (US)

( * ) Notice: Subject to any disclaimer, the term of this patent is extended or adjusted under 35 U.S.C. 154(b) by 899 days.

(21) Appl. No.: 11/625,253

(22) Filed: Jan. 19, 2007

(65) Prior Publication Data

US 2008/0085119 A1 Apr. 10, 2008

Related U.S. Application Data

(60) Provisional application No. 60/849,343, filed on Oct. 4, 2006.

(51) Int. Cl.
*H04J 14/02* (2006.01)

(52) U.S. Cl. .............................. 398/85; 398/79; 398/82; 398/83; 398/87; 385/24; 385/37; 385/33

(58) Field of Classification Search .................. 398/33, 398/38, 83, 84, 85, 87, 79, 82, 45, 48, 49, 398/50, 56; 385/24, 37, 27, 16, 17, 18, 15, 385/19, 14, 33, 47, 39, 78
See application file for complete search history.

(56) References Cited

U.S. PATENT DOCUMENTS

| | | | |
|---|---|---|---|
| 6,204,946 B1 | 3/2001 | Aksyuk et al. | |
| 6,628,856 B1 | 9/2003 | Costello et al. | |
| 6,782,153 B2 | 8/2004 | Polinsky et al. | |
| 6,791,694 B2 | 9/2004 | Pezeshki | |
| 7,085,492 B2* | 8/2006 | Ibsen et al. | 398/38 |
| 7,321,704 B2* | 1/2008 | Ducellier et al. | 385/15 |
| 2004/0136074 A1 | 7/2004 | Ford et al. | |
| 2004/0252938 A1* | 12/2004 | Ducellier et al. | 385/27 |
| 2005/0074204 A1 | 4/2005 | Wilson et al. | |
| 2005/0213978 A1* | 9/2005 | Yamashita et al. | 398/79 |
| 2006/0098981 A1* | 5/2006 | Miura et al. | 398/45 |
| 2008/0085119 A1 | 4/2008 | Ye et al. | |

OTHER PUBLICATIONS

Thomas D. MacBlain, *Letter to James Hsue via U.S. Mail, Certified Return Receipt*, Nov. 23, 2009, 1 page.
Thomas D. MacBlain, *Letter to James Hsue via U.S. Mail, Certified Return Receipt*, Oct. 30, 2009, 1 page.
Wilson et al., *Spectral Filter with Independently Variable Center Wavelength and Bandwidth*, presented at ECOC 2004 Conference in Stockholm in Aug. 2004.

* cited by examiner

*Primary Examiner* — Hanh Phan
(74) *Attorney, Agent, or Firm* — Davis Wright Tremaine LLP

(57) ABSTRACT

At least one diffraction element is used to diffract light of multiple wavelengths into different wavelength components. Instead of moving the diffraction element as in certain prior filters, light from the at least one element is reflected back towards the at least one element so that light is diffracted at least twice by the at least one element. The reflection is such that at least one selected wavelength component of said wavelength components will pass from an input port to an output port or to another device.

17 Claims, 13 Drawing Sheets

TOP VIEW

SIDE VIEW

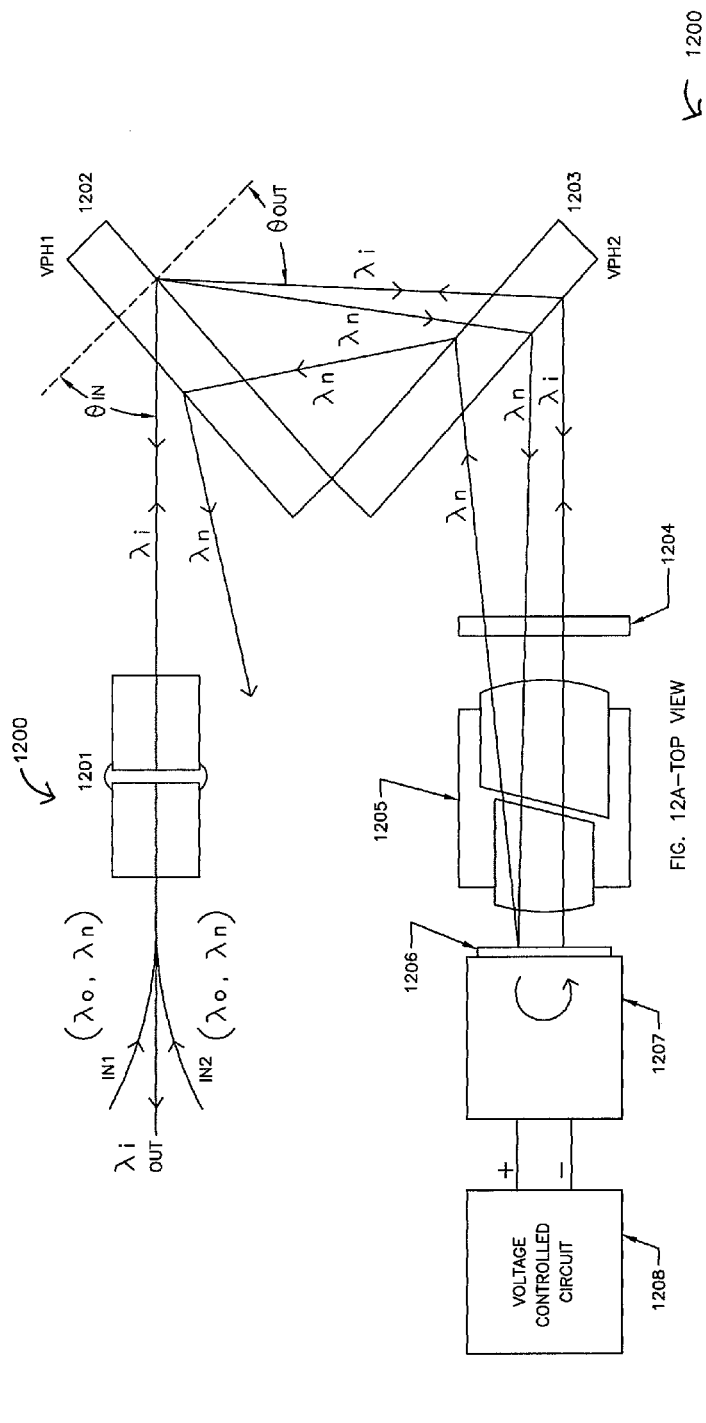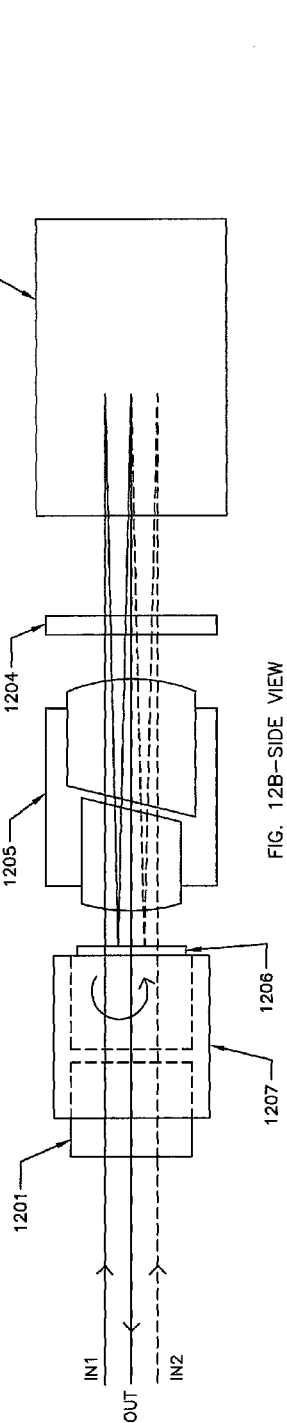
FIG. 12A—TOP VIEW
FIG. 12B—SIDE VIEW
FIG. 12

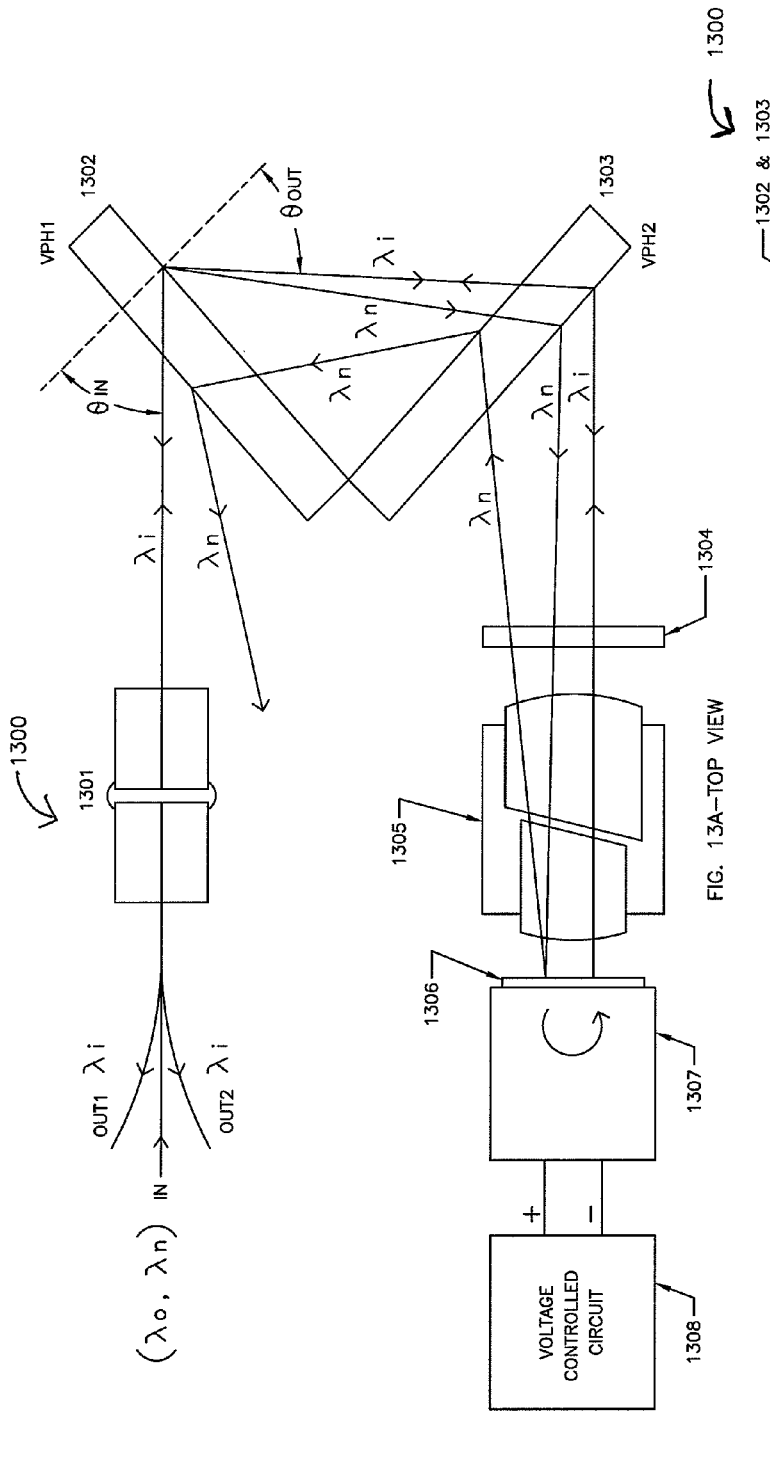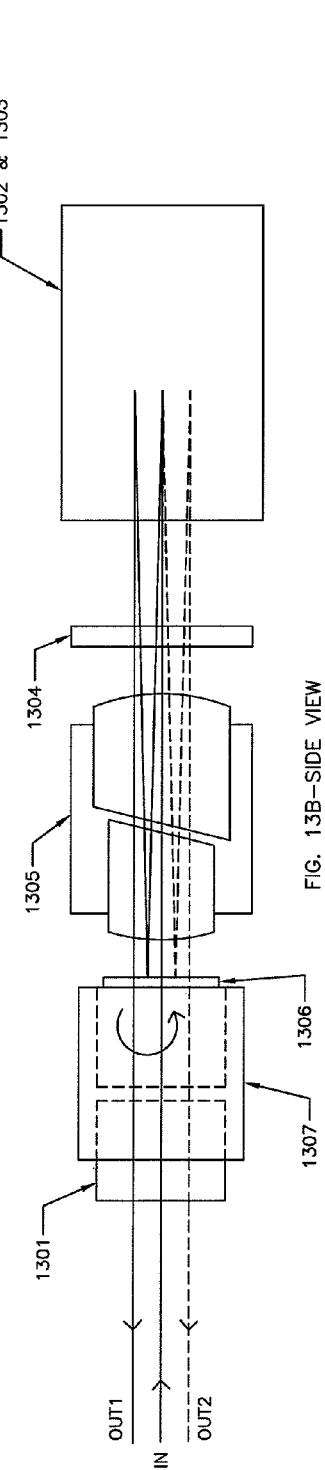
FIG. 13A—TOP VIEW
FIG. 13B—SIDE VIEW
FIG. 13

COMPACT HIGH-RESOLUTION TUNABLE OPTICAL FILTER USING OPTICAL DIFFRACTION ELEMENT AND A MIRROR

CROSS REFERENCE TO RELATED APPLICATION

This patent application claims the benefit of U.S. provisional patent application No. 60/849,343 entitled "Compact High Resolution Tunable Filter Using Cascaded Gratings and Reflective MEMS Micromirror", filed on Oct. 4, 2006.

BACKGROUND OF THE INVENTION

This invention relates generally to the optical components used in optical communication networks, and specifically to an optical component that combines a tuning element with one or more diffraction elements to create a tunable optical filter.

Optical communication networks are built by combining sub-systems, modules, or components which perform specific functions, including the function of selecting or removing a particular wavelength or group of wavelengths from an optical signal that contains multiple wavelengths. A general description of optical networking functions and applications can be found in "Introduction to DWDM Technology", by Stamatios Kartalopoulos, Wiley-Interscience, 2000. Traditionally, the function of selecting or removing a particular wavelength or group of wavelengths from a multiple-wavelength optical signal has been implemented using fixed optical filters, incorporated into devices such as Optical Add/Drop Multiplexers (OADMs). Reconfigurable Optical Add/Drop Multiplexers (ROADMs) are OADMs in which the particular wavelength(s) that are being selected or removed can be modified dynamically. This enables dynamic and rapid reconfiguration of optical communication networks.

There is therefore a need to provide tunable optical filters that allow the dynamic reconfiguration of the particular wavelength or group of wavelengths that will be selected or removed from a multiple-wavelength optical signal.

FIGS. 1, 2, 3 represent three embodiments of the prior art in tunable optical filters. The prior art will be described in detail with reference to the figures. Similar elements in these three figures are labeled using numerals in which the last two digits are the same.

In FIG. 1, 101 is the input collimator consisting of a fiber ferrule and a micro-lens of filter 100. It carries multiple wavelengths or optical channels, $\lambda_0$ through $\lambda_n$. 102 is a rotating or tilting thin-film bandpass optical filter, which selectively passes the preferred wavelength channel $\lambda_i$. 103 is the output collimator, which carries $\lambda_i$. The shortcomings of the filter 100 are that the motor (not shown) that is typically used to rotate or tilt the thin-film optical filter along the direction of the arrow in FIG. 1 is bulky and slow. The mechanical wear-out mechanism of this motor is not a good fit to the multi-million cycles that are required by the network application. Also, the width of the passband of the filter varies as a function of the tilt angle, resulting in optical characteristics that are not uniform across the filter's tuning range. The polarization dependent loss (PDL) that results from the angled thin-film filter is also a concern.

In FIG. 2, 202 is a linearly-variable thin-film filter that is moved laterally across the optical beam by a stepping motor (not shown) along the direction of the arrow in FIG. 2. The passed wavelength changes continuously across the length of the linearly-variable thin-film filter. Thus the preferred wavelength $\lambda_i$ is selected and passed. The major shortcomings of this prior art are similar to that of the prior art shown in FIG. 1, in that the required motor is bulky, slow, and prone to premature wear-out. In addition, it is very difficult to fabricate a linearly-variable thin-film filter that will separate the narrowly spaced optical channels that are used in modern DWDM systems (e.g. DWDM systems with 50 GHz. Channel spacing), due to thin-film non-uniformity across the beam area.

In FIG. 3, an electrically, thermally, or acoustically controlled tunable wavelength etalon device serves as the wavelength selecting element. By changing the effective length of the optical path through the etalon cavity, via the application of external energy, the appropriate wavelength can be selected. As an example, an electrically-controlled micromechanical etalon filter was described in the article entitled, "widely tunable Fabry-Perot filter using Ga(Al)As—AlOx deformable mirrors" in IEEE Photonics Technology Letters, pages 394-395, March, 1998. In this device, an electric voltage adjusts the air gap between two reflective layers to tune the central wavelength.

Other tunable filter vendors use one or more thermally-sensitive cavity layers between the reflective layers of a traditional thin-film filter structure. The cavity layer(s) have an index of refraction that is therefore sensitive to temperature. The central wavelength can therefore be tuned by causing the cavity layer's refractive index to change through temperature variation.

All of these thermally-actuated designs employ expensive actuation and/or control technology and are thermally unstable due to the intrinsic nature of the cavity material. Closed loop tracking and control mechanisms are usually needed, which increases cost and package size.

None of the above tunable optical filters is entirely satisfactory. It is thus desirable to provide tunable optical filters with improved characteristics.

SUMMARY OF THE INVENTION

To overcome the drawbacks of prior tunable filters, at least one diffraction element is used to diffract light of multiple wavelengths into different wavelength components. Instead of moving the diffraction element as in certain prior filters, light from the at least one element is reflected back towards the at least one element so that light is diffracted at least twice by the at least one element. The reflection is such that at least one selected wavelength component of said wavelength components will pass from an input port to an output port or to another device.

In an optical monitoring application of the above technique, if the at least one selected wavelength component is passed to an optical sensor, then one or more selected wavelength components of light from an input can be monitored.

In a switching and filtering application of the above technique, at least one selected wavelength component of wavelength components of light from one of at least two input ports is passed to an output port, or from an input port to one of at least two output ports. This technique can be used for selectively passing at least one selected wavelength component of said wavelength components of light from one of at least two input ports to one of at least two output ports.

All patents, patent applications, articles, books, specifications, standards, other publications, documents and things referenced herein are hereby incorporated herein by this reference in their entirety for all purposes. To the extent of any inconsistency or conflict in the definition or use of a term between any of the incorporated publications, documents or

BRIEF DESCRIPTION OF THE DRAWINGS

FIGS. 12A and 12B provide top and side views of another embodiment of a tunable optical filter, according to the present invention, that incorporates switching between two input fibers.

FIGS. 13A and 13B provide top and side views of another embodiment of a tunable optical filter, according to the present invention, that incorporates switching between two output fibers.

Figure 1:
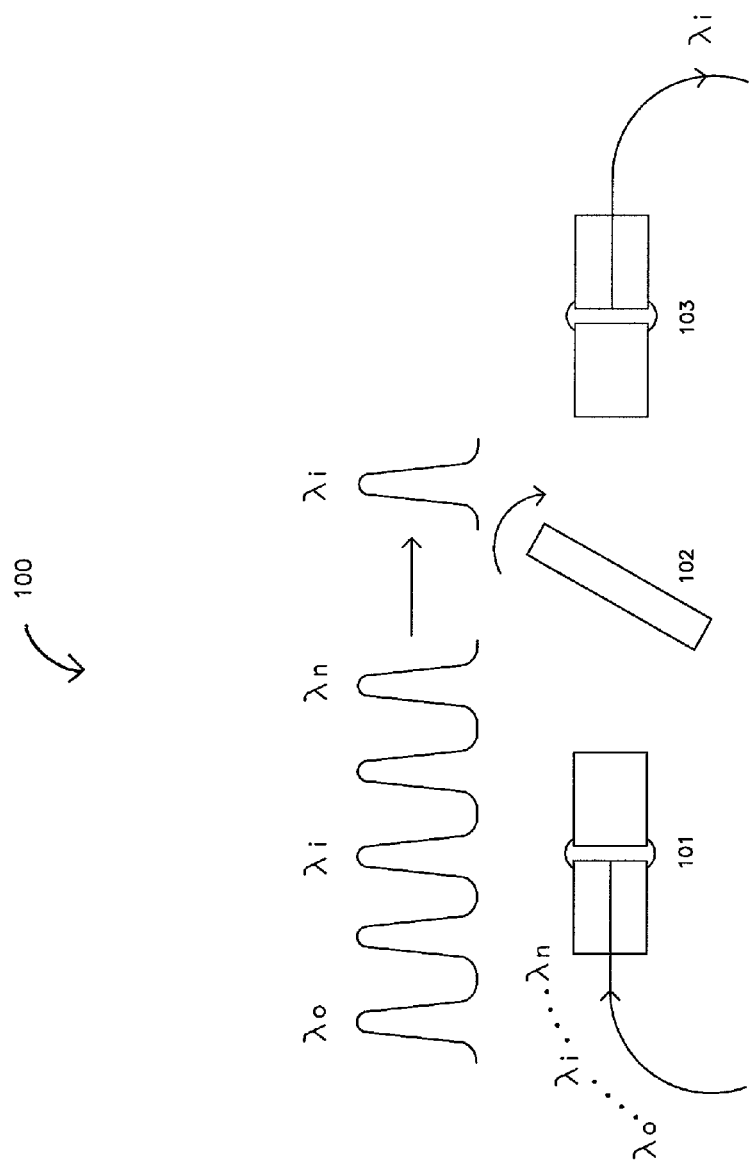
FIG. 1 is a representation of the prior art of using a tilting thin-film optical filter as a tunable optical filter.
Figure 2:
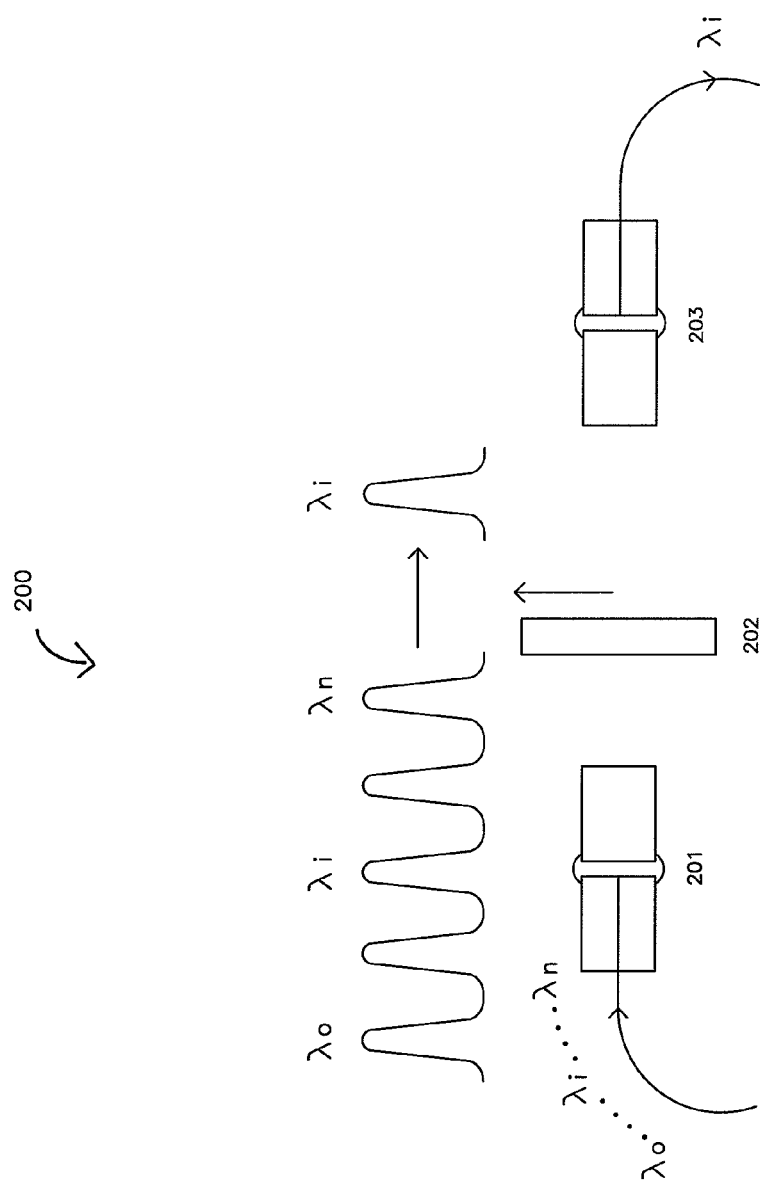
FIG. 2 is a representation of the prior art of using a sliding linearly-variable thin-film filter as a tunable optical filter.
Figure 3:
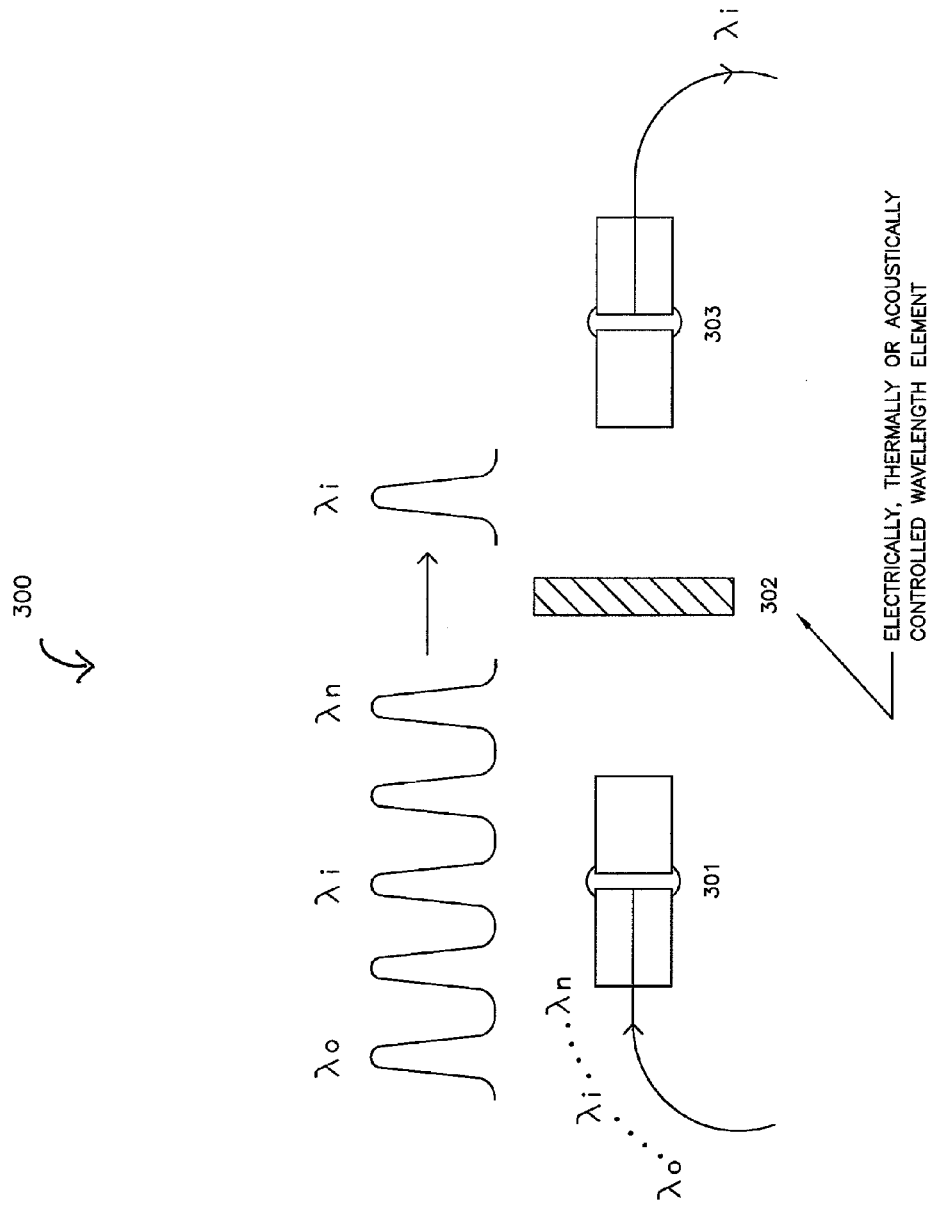
FIG. 3 is a representation of the prior art of using an electrically, thermally, or acoustically-controlled wavelength element as a tunable optical filter.

For simplicity in description, identical or similar components in FIGS. 5A, 5B, 10, 11A, 11B, 12A, 12B, 13A and 13B are labeled in this application by using numerals in which the last two digits are the same.

DETAILED DESCRIPTION OF THE EXEMPLARY EMBODIMENTS

Tunable optical filters are a key building block of reconfigurable optical communication networks. The ideal tunable optical filter would provide low insertion loss and a wide passband for the selected or desired wavelength(s), while simultaneously providing high isolation of other, non-selected wavelengths. It would provide a wide tuning range, and incorporate a tuning mechanism that was fast and yet not subject to rapid wear-out. Further, the optical characteristics of the tuned or selected passband should not vary as a function of wavelength. Other highly desirable attributes include low cost, compact size, low power consumption, and high reliability.

The prior art in tunable optical filters typically possess one or more significant shortcomings, including insufficient tuning range, slow tuning speed, rapid wear-out of the tuning mechanism, optical characteristics that vary significantly as a function of the tuned wavelength(s), as well as the typical disadvantages of high cost, large size, high power consumption, and low reliability.

Certain embodiments of the present invention combine a microfabricated MEMS (Micro-Electro-Mechanical System) mirror, used as the tuning element, with cascaded optical diffraction gratings to achieve a tunable optical filter that possesses the desired attributes of wide tuning range, fast tuning speed, and optical characteristics that are highly consistent across the tuning range. Further, the microfabricated MEMS mirror that is used as the tuning element is not subject to rapid wear-out, as would be the case with an electric motor actuator. While microfabricated MEMS mirrors are preferable, other types of mirrors or light reflective elements may also be used and are within the scope of the invention.

The use of cascaded optical diffraction gratings, as well as the use of a reflective tuning element that allows the optical signal to pass each grating twice, results in a compact device structure and allows the use of low-cost gratings. The diffraction gratings may be transmissive or reflective, although transmissive gratings are preferred in the present invention. Optical transmission gratings can be fabricated by creating grooves on a substrate surface, or by creating a periodic index variation pattern over the substrate, as with a Volume Phase Holographic grating. It is preferred that the grating be relatively insensitive to polarization. While some embodiments employ multiple optical diffraction gratings, for some applications, a single optical diffraction grating may suffice.

The use of a microfabricated MEMS mirror as the tuning element results in low cost, compact size, low power consumption, and high reliability. The use of a 3-D MEMS mirror that can be tilted on two orthogonal axes results in one embodiment in which minor optical misalignment of the input and output fibers, the diffraction gratings, and the MEMS mirror can be adjusted for, using the second tilt axis of the mirror. (One axis is the primary axis for the tuning action, while the second axis is used for minor adjustment of optical alignment.)

FIGS. 4A and 4B provide top and side views of one embodiment 400 of the tunable optical filter, according to the present invention, using two cascaded optical transmission gratings.

401 is a dual fiber collimator that serves to lower the cost of the device, and makes the device more compact by sharing a single microlens. 402 and 403 are two cascaded optical transmission gratings that are aligned to be nearly vertical. "Vertical" in the description of the various embodiments herein refers to a direction perpendicular to the plane of the page or paper of top views of the embodiments, and a direction in or parallel to the plane of the page or paper of side views of the embodiments. The two gratings 402 and 403 are thus perpendicular to the plane of the page or paper. They are tilted slightly to provide for a small vertical offset (shown more clearly in FIG. 4B) between the input and output optical beams. 404 is a quarter waveplate that rotates the polarization of the optical beam by 90 degrees. 405 is a microfabricated MEMS (Micro-Electro-Mechanical System) mirror. 406 is chip carrier that holds the MEMS mirror device. 407 is the voltage control circuit that provides a precisely controlled voltage that tunes and determines the angle position about a vertical axis of the MEMS mirror by applying an appropriate voltage to driving electrodes (not shown) that causes the MEMS mirror to move by electrostatic force. Chip carrier

406 and voltage control circuit 407 thus form a part of an actuator (which also includes the driving electrodes) that moves (e.g. rotates) the mirror 405 to tune the filter by selecting one or more of the wavelength components in the light from the input port that will be directed towards the output port.

A single optical transmission grating typically provides a very low dispersion effect. This makes it hard to separate the closely spaced wavelength channels that are used in DWDM systems with 100 GHz or 50 GHz channel spacings. While gratings with larger dispersion power exist, they are usually significantly more expensive and are further complicated by the need to add special prisms. The present invention overcomes this limitation by using two cascaded optical transmission gratings, as well as a high resolution reflective MEMS mirror to pass the signal four times through a grating (by passing twice through each of two gratings). This significantly increases the total dispersion angle achieved, and thus results in a high degree of adjacent channel isolation.

Referring to FIGS. 4A and 4B, an optical signal carrying multiple wavelengths $\lambda_0, \ldots \lambda_i, \ldots \lambda_n$ (from shorter to longer wavelengths) starts from the IN port. After passing the 402 optical transmission grating, its spectrum is dispersed. The dispersion angle can be expressed by the following equation:

$$\lambda f = \sin\theta_{in} + \sin\theta_{out}$$

where f is the spatial frequency of the grating, $\theta_{in}$ is the incident angle relative to the normal direction to the grating, and $\theta_{out}$ is the exiting angle relative to the normal direction to the grating.

For $\lambda=1545$ nm, f=940 lines/mm, the incident and exiting angles $\theta$ is about 46.6 degrees supposing $\theta_{in}=\theta_{out}$.

Usually the dispersion achieved from a single grating is very small (about 0.08 degree/nm for a typical low cost grating). The second grating 403, which can be exactly or substantially the same as the grating 402, is cascaded with grating 402, thereby resulting in a doubling of the dispersion effect. The preferred or dropped wavelength (wavelength component) $\lambda_i$ is further selected by tuning a high-resolution reflective MEMS mirror, which guides the $\lambda_i$ wavelength signal back to the OUT fiber (output port), passing through both of the cascaded gratings a second time. The path of the $\lambda_i$ wavelength signal is then the optical path between the input and output fibers or ports selected by the actuator which comprises the circuit 407. The rest of the wavelengths or wavelength components in the original optical signal ($\lambda_n$ is shown as a representative) are rejected due to the larger (or smaller) total dispersion angle (four times the dispersion from a single grating) from the preferred wavelength $\lambda_i$. The quarter waveplate 404 serves as a polarization exchange element that effectively reduces the polarization dependent loss arising from the gratings. If desired, the return optical path of the light from mirror 405 to the output fiber may be routed through only one of the two gratings 402, 403, so that the light experiences a total of three dispersions instead of four. This can be done by employing additional reflective and other optical elements (not shown), for example.

The MEMS mirror shown in these embodiments of the present invention is preferably fabricated from single-crystalline silicon, using semiconductor fabrication processes such as photolithography and a combination of Deep Reactive Ion Etching (DRIE) and wet etching. The resulting MEMS mirror structure can be either a single-axis tilt mirror, or a "3-D" MEMS mirror that has two orthogonal tilt axes. In the single-axis mirror design, the moving mirror is suspended from the fixed surrounding structure by silicon torsion beams. Electrostatic actuators are used to tilt the mirror, with the tilt angle of the mirror being accurately and repeatably controlled by the voltage that is applied to the actuators. In the 3-D two-axis mirror design, two sets of electrostatic actuators are used. One set of actuators tilts a gimbal assembly that contains the mirror within it. The second set of actuators tilts the mirror within the gimbal. The mirror is suspended within the gimbal by one set of silicon torsion beams, and the gimbal is suspended within the fixed surrounding structure of the device by a second set of silicon torsion beams, oriented orthogonally to the mirror's torsion beams. This allows a continuous range of tilting motion on two axes. MEMS mirror structures and their electrostatic control mechanisms used herein and their fabrication may be of the type described in U.S. Pat. Nos. 6,628,856 and 6,782,153, so that a detailed description thereof is not necessary here.

The use of a MEMS mirror in the present invention provides several benefits, including compact size, low power consumption, and high reliability. The use of a MEMS mirror design that incorporates single-crystalline silicon torsion beams results in a tilt-mirror structure that has almost no wear-out mechanism under repeated and long-term cycling or tuning of the mirror. Due to the non-ductile nature of the silicon torsion beams, the tilt angle versus applied voltage characteristic of the MEMS mirror is highly repeatable, and does not change as a result of long-term cycling or tuning of the mirror.

The dimensions of the MEMS mirror and its placement are designed such that all of the wavelengths contained in the multiple-wavelength input signal will hit the mirror surface, after being dispersed by passing through the two optical transmission gratings. The primary tilt (vertical) axis of the MEMS mirror is oriented so that changing the tilt angle of the mirror results in the selected $\lambda_i$ wavelength signal being guided back to the OUT fiber. If a 3-D MEMS mirror is used, with a second, orthogonal tilt (horizontal) axis, minor adjustment of the second tilt axis can be used to more precisely adjust the vertical alignment of the optical beam, thereby compensating for minor misalignment of either the input or output fibers. "Horizontal" in the description of the various embodiments herein refers to a direction in or parallel to the plane of the page or paper of top views of the embodiments, and a direction perpendicular to the plane of the page or paper of side views of the embodiments. In short, one axis is used for tuning; the second axis is used for find adjustment. The tunable optical filter can also be implemented using a single-axis MEMS mirror. In this case, the vertical alignment of the input and output fibers, the gratings, and the MEMS mirror itself, are all precisely controlled.

Figure 4:
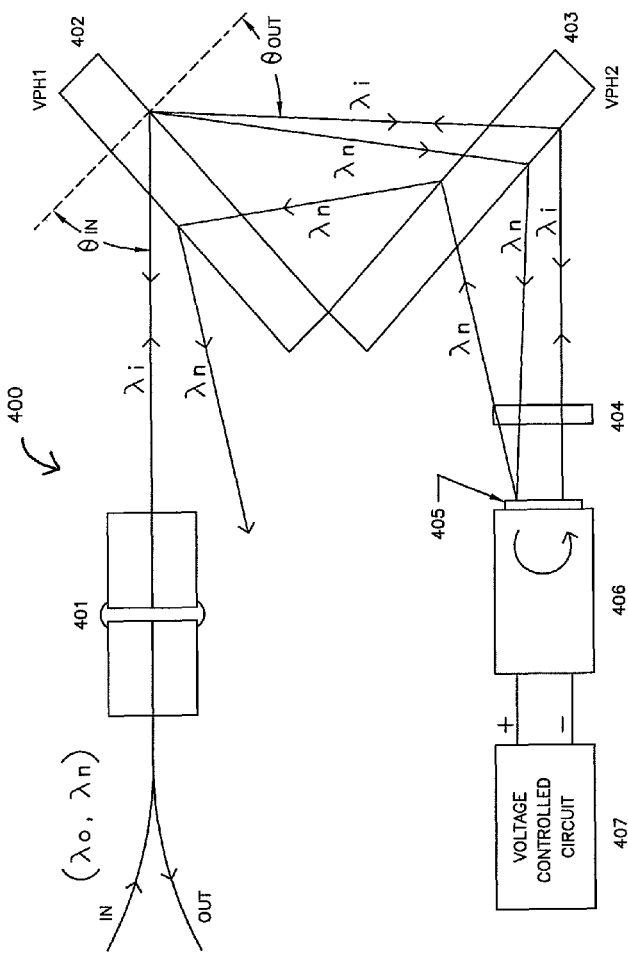
FIGS. 4A and 4B provide top and side views of one embodiment of the tunable optical filter, according to the present invention, using two cascaded optical transmission gratings.
Figure 5:
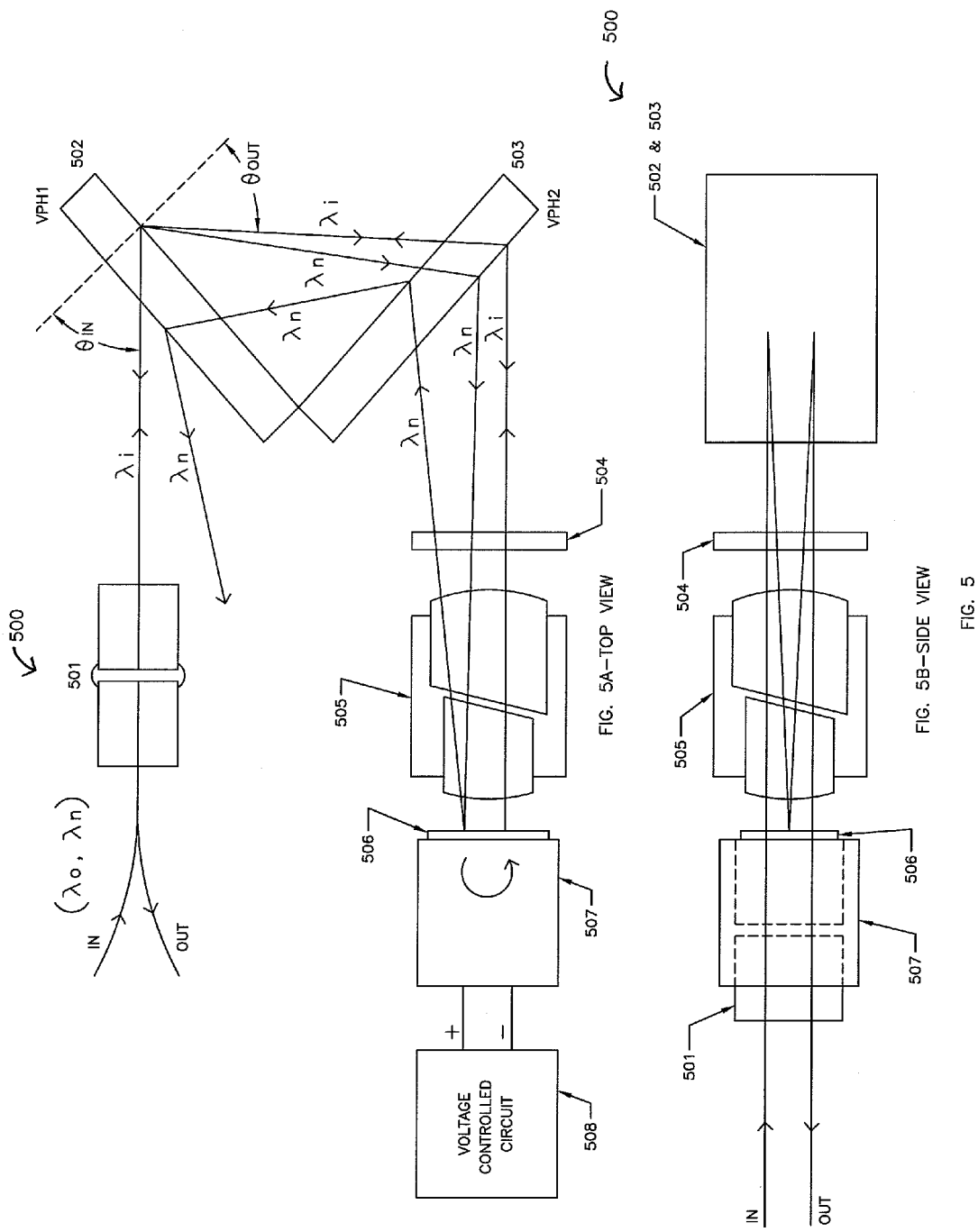
FIGS. 5A and 5B provide top and side views of another embodiment of the tunable optical filter, according to the present invention, that is similar to FIGS. 4A and 4B except that a beam-size conversion element has been added.

In FIGS. 5A and 5B, a derivative embodiment 500 of FIG. 4 is shown. 501 is a dual fiber collimator that serves to lower the cost of the device, and makes the device more compact by sharing a single microlens. 502 and 503 are two cascaded optical transmission gratings that are aligned to be nearly vertical. The two gratings 502 and 503 are thus perpendicular to the plane of the page or paper. They are tilted slightly to provide for a small vertical offset (shown more clearly in FIG. 5B) between the input and output optical beams. 504 is a quarter waveplate that rotates the polarization of the optical beam by 90 degrees. 506 is a microfabricated MEMS (Micro-Electro-Mechanical System) mirror. 507 is chip carrier that holds the MEMS mirror device. 508 is the voltage control circuit that provides a precisely controlled voltage that tunes and determines the angle position about a vertical axis of the MEMS mirror. If a 3-D MEMS mirror is used, voltage control circuit 508 may also be used to cause tilt about the horizontal axis, to make minor adjustment about the second tilt axis to more precisely adjust the vertical alignment of the optical beam. In the embodiment of FIGS. 5A and 5B, a beam-size conversion element 505 is introduced to adjust the beam size coming out of the 501 collimator to match the size of the MEMS mirror surface area. Aside from this feature, embodiment 500 is substantially similar to embodiment 400. The four embodiments of the detailed structure of the beam-size conversion element are illustrated in FIGS. 6A-6D. The beam-size conversion element comprises a lens holder holding two lenses with different focal lengths. Suppose that the larger focal length is F and the smaller is f. The diameter of the input beam from the side of the larger focal length lens should be reduced to f/F of that of the input beam.

Figure 6:
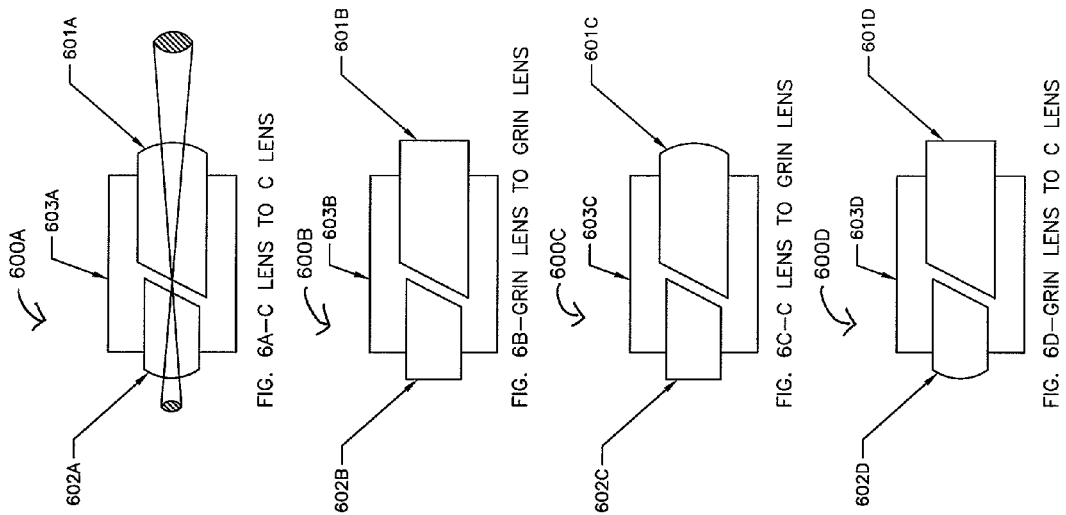
FIGS. 6A, 6B, 6C, and 6D provide cross-sectional views of several embodiments of the beam size conversion element that is shown in FIGS. 5A and 5B.

In FIGS. 6A, 6B, 6C, and 6D, four different combinations of GRIN lenses (lenses which incorporate a graded index of refraction to focus light) and C lenses (lenses which are cylindrical in shape, and use a shaped end-face to focus light) are shown. The four combinations are: C lens to C lens; GRIN lens to GRIN lens; C lens to GRIN lens; and GRIN lens to C lens. Some other combinations are also applicable, such as convex lens to convex lens. Referring to the C lens to C lens example shown in FIG. 6A, 601A is a C lens with larger focal length F, which usually has a larger diameter and longer length. 602A is a C lens with smaller focal length f which usually has a smaller diameter and shorter length. 603A is the lens holder. In FIG. 6B, 601B is a GRIN lens with larger focal length F, which usually has a larger diameter and focal length. 602B is a GRIN lens with smaller focal length f, which usually has a smaller diameter and shorter length. 603B is the lens holder. In FIG. 6C, 601C is a C lens with larger focal length F. 602C is a GRIN lens with smaller foal length f. 603C is the lens holder. In FIG. 6D, 601D is a GRIN lens with larger focal length F. 602D is a C lens with smaller foal length f. 603D is the lens holder. In all four FIGS. 6A, 6B, 6C, and 6D, the inside faces of the two lenses are angle-polished at 6 or 8 degrees to reduce the back-reflected light.

Figure 7:
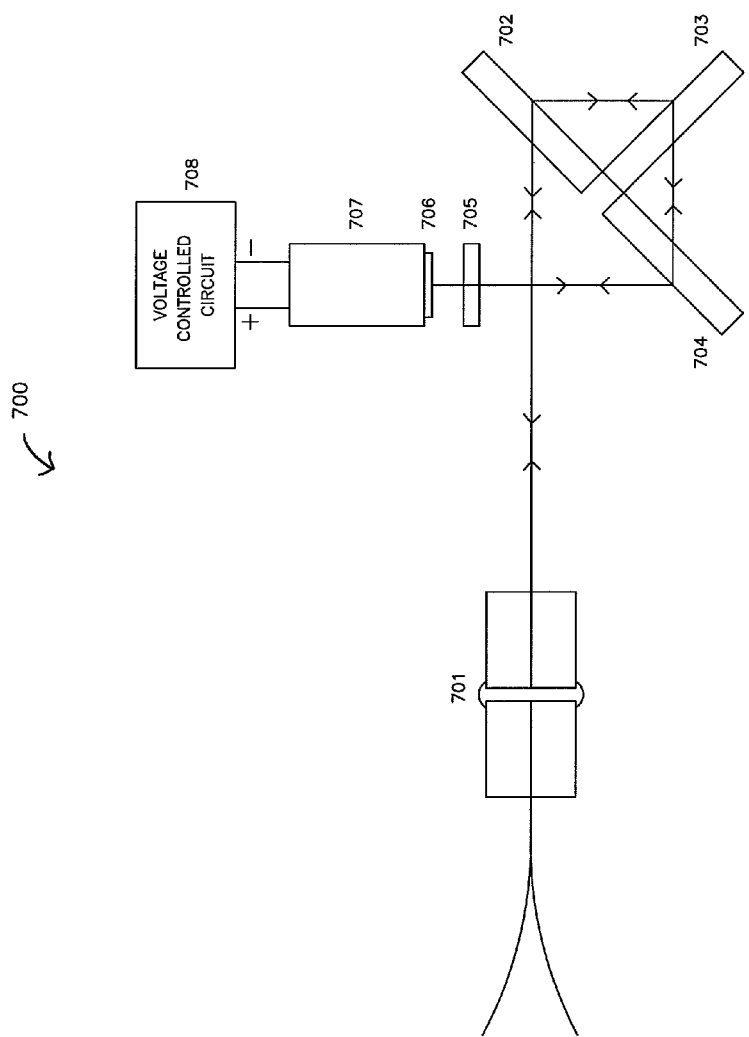
FIG. 7 provides a top view of another embodiment of the tunable optical filter, according to the present invention, that incorporates three cascaded gratings.
Figure 8:
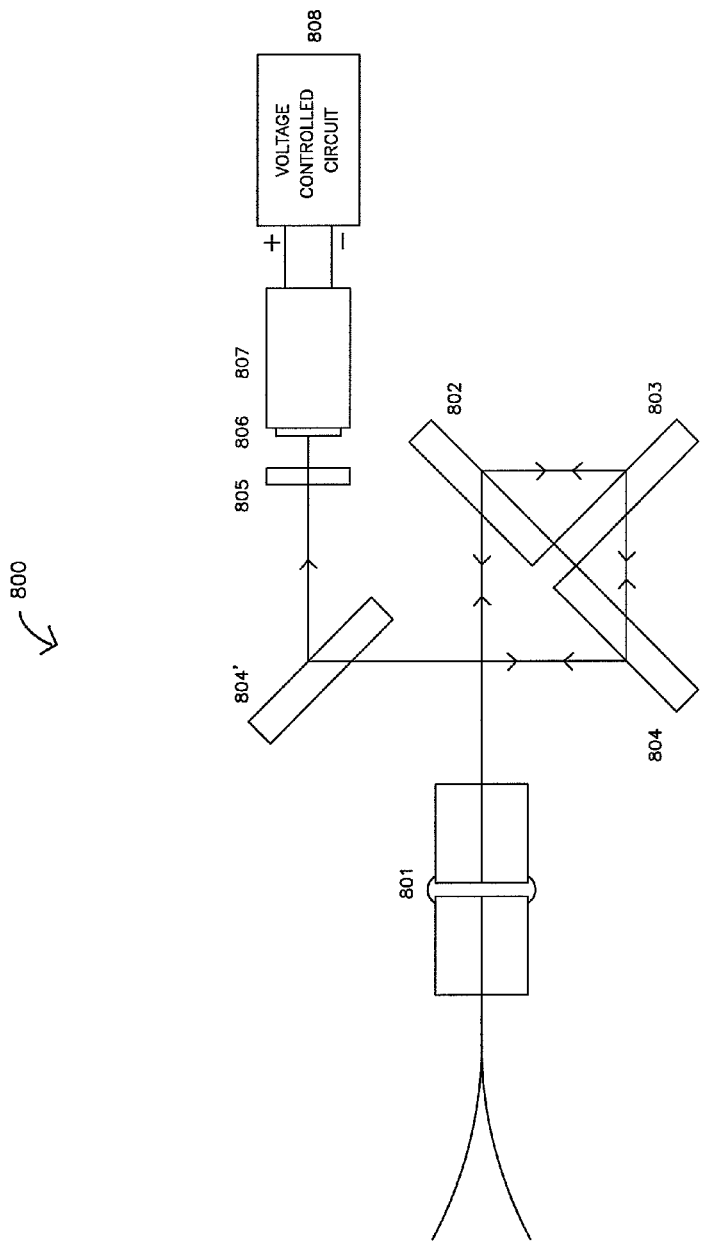
FIG. 8 provides a top view of another embodiment of the tunable optical filter, according to the present invention, that incorporates four cascaded gratings.
Figure 9:
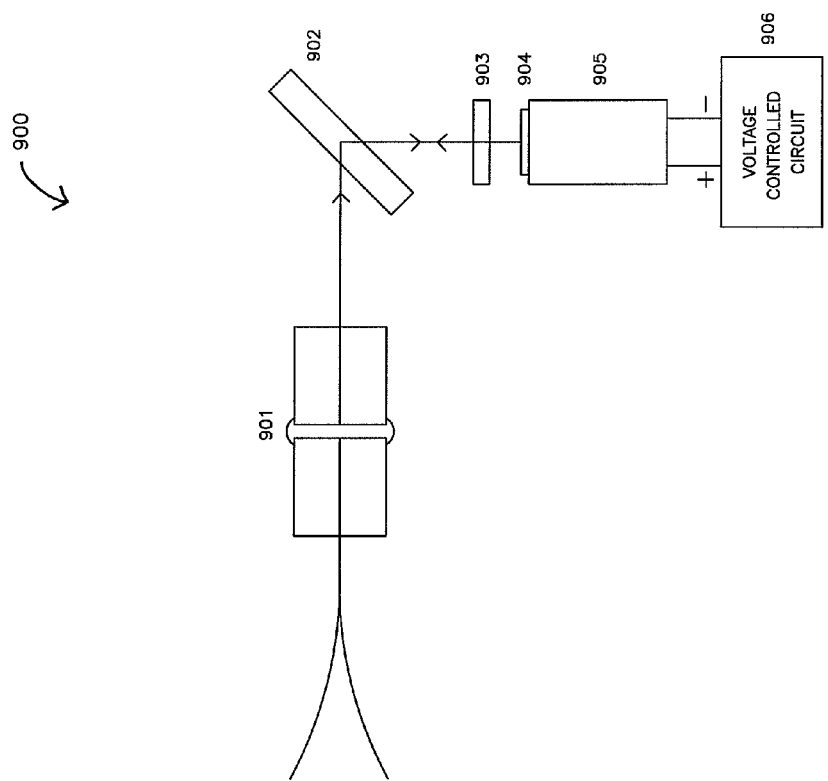
FIG. 9 provides a top view of another, simplified embodiment of the tunable optical filter, according to the present invention, that incorporates a single grating.

FIGS. 7 and 8 show additional embodiments of the present invention with three (three gratings in FIG. 7: 702, 703, 704) and four (four gratings in FIG. 8: 802, 803, 804 and 804') cascaded optical transmission gratings, respectively, to further increase the dispersion effect of the device. FIG. 9 shows a simplified embodiment of the present invention, using a single optical transmission grating 902. 701, 801 and 901 are dual fiber collimators similar to dual fiber collimator 501 of FIGS. 5A and 5B. 705, 805 and 905 are beam-size conversion elements similar to beam-size conversion element 505 of FIGS. 5A and 5B. 706 and 806 are microfabricated MEMS (Micro-Electro-Mechanical System) mirrors similar to microfabricated MEMS (Micro-Electro-Mechanical System) mirror 506 of FIGS. 5A and 5B. 904 is a microfabricated MEMS (Micro-Electro-Mechanical System) mirror similar to microfabricated MEMS (Micro-Electro-Mechanical System) mirror 506 of FIGS. 5A and 5B. 707, 807 and 905 are chip carriers that hold respectively the MEMS mirrors 706, 806 and 904, similar to chip carrier 507 of FIGS. 5A and 5B. 708, 808 and 906 are the voltage control circuits that provide precisely controlled voltages that tune and determine the angle positions about vertical axes of the MEMS mirrors 706, 806 and 904 respectively, similar to voltage control circuit 508 of FIGS. 5A and 5B. In the embodiments of FIGS. 7, 8 and 9, light passes twice through the three, four cascaded optical transmission gratings and the single optical transmission grating respectively to disperse the wavelength components, as indicated by the directions of the arrows on the optical path between the input and output ports/fibers. Due to the reduced dispersion effect of a single grating, the embodiment shown in FIG. 9 would provide a somewhat reduced level of optical performance, such as reduced adjacent channel isolation.

Figure 10:
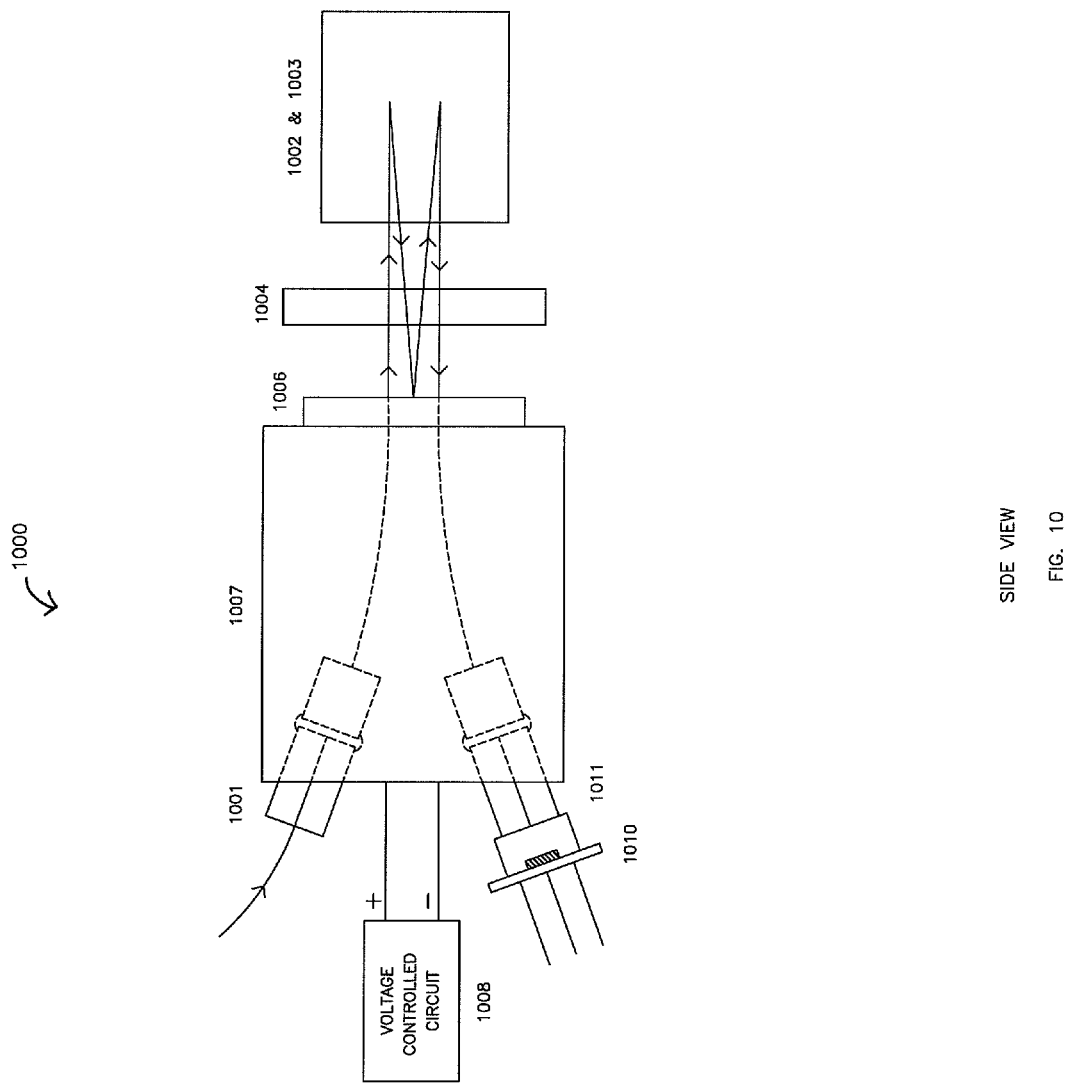
FIG. 10 provides a top view of one embodiment of a tunable optical detector for optical channel monitoring, according to the present invention, FIGS. 11A and 11B provide top and side views of another embodiment of a tunable optical detector for optical channel monitoring, according to the present invention.
Figure 11:
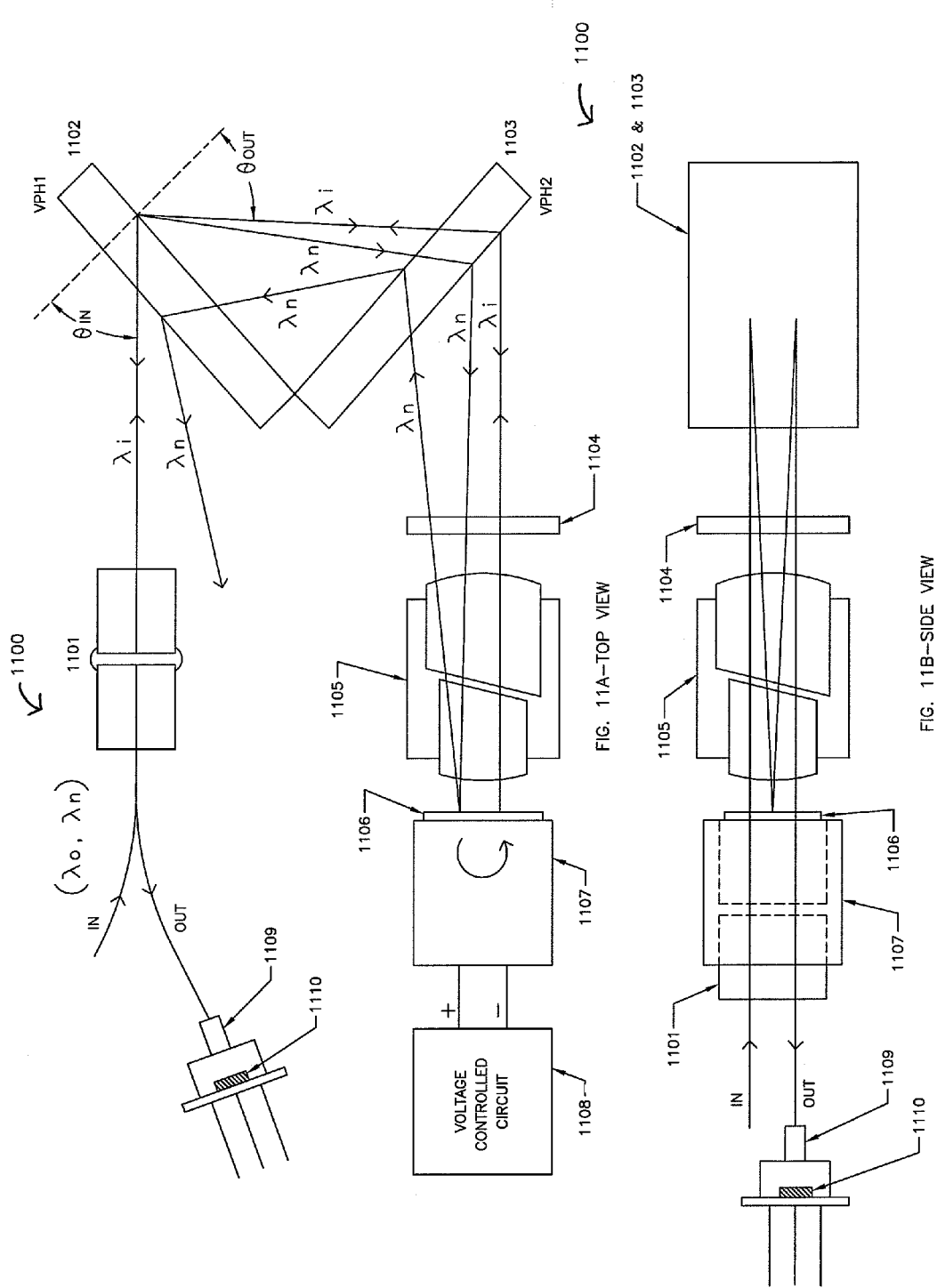

FIGS. 10, 11A and 11B show respectively a schematic, top and side views of two embodiments of tunable optical detectors, according to the present invention, intended for application as optical channel monitors. In both of these embodiments, two cascaded optical transmission gratings (1002, 1003 in FIG. 10 and 1102, 1103 in FIGS. 11A and 11B) are used. In both embodiments, an optical sensor such as a high-speed semiconductor photo-detector or photodiode is implemented onto the output side. The tunable optical detector embodiment 1000 of the present invention shown in FIG. 10 uses separate collimating elements for the input and output optical signals. 1001 is a combination of a lens and ferrule to form an input collimator. 1011 is a combination of a lens and ferrule to form an output collimator. 1010 is an APD photodiode (avalanche photodiode) that has been bonded to the output collimator 1011. In FIG. 10, optical components 1002, 1003, 1004, 1006, 1007, 1008 perform substantially the same functions as those of 502, 503, 504, 506, 507, and 508 of FIGS. 5A and 5B respectively. Since FIG. 10 is a side view of the optical system 1000, gratings 1002, 1003 are not shown as separate. The operation of the embodiment shown in FIG. 10 is similar to the operation of the embodiment shown in FIGS. 5A and 5B, as described above, except that, instead of passing the selected wavelength component(s) to an output port/fiber as in FIGS. 5A, 5B, such components are passed to APD 1010. FIGS. 11A and 11B are the top and side views of a tunable optical detector embodiment 1100 of the present invention that uses a single collimating element for the input and output optical signals, in a way that is similar to the embodiment shown in FIGS. 5A and 5B. In FIGS. 11A and 11B, 1109 is a fiber ferrule to be bonded with APD photo-diode 1110. The combination of 1109 and 1110 is then attached to the output fiber that comes out of the collimator 1101. Optical components 1101, 1102, 1103, 1104, 1105, 1106, 1107 and 1108 perform substantially the same functions as those of 501, 502, 503, 504, 505, 506, 507 and 508 of FIGS. 5A, 5B respectively. The operation of the embodiment shown in FIGS. 11A and 11B is similar to the operation of the embodiment shown in FIGS. 5A and 5B, as described above, except that, instead of passing the selected wavelength component(s) to an output port/fiber as in FIGS. 5A, 5B, such components are passed to APD 1110.

FIGS. 12A and 12B are top and side views of an additional embodiment 1200 of the present invention, in which a third fiber is added as an additional input fiber. The second horizontal tilt axis of the 3-D MEMS mirror 1206 can therefore be used to select one of two input beams as the source of the tuned wavelength. In this embodiment, the tunable optical filter is also combining the function of a 2×1 optical switch. Optical components 1201, 1202, 1203, 1204, 1205, 1206, 1207 and 1208 perform substantially the same functions as those of 501, 502, 503, 504, 505, 506, 507 and 508 of FIGS. 5A and 5B respectively. The operation of the embodiment shown in FIGS. 12A and 12B is similar to the operation of the embodiment shown in FIGS. 5A and 5B, as described above. The tuning action of the MEMS mirror, as shown in the Top View of FIG. 12A, is essentially unchanged. In the Side View of FIG. 12B, however, the tilt angle (indicated by the curved arrow in block 1207 in FIG. 12B) of the MEMS mirror around its horizontal axis determines whether the optical signal coming in on IN1 is directed to the OUT fiber (the optical path shown as a solid line), or if the optical signal coming in on IN2 is directed to the OUT fiber (the optical path shown as a dashed line). The mirror 1206 is a 3-D MEMS mirror, and voltage control circuit 1208 may be used to cause tilt about the horizontal axis. In either case, the tilt angle (indicated by the curved arrow in block 1207 in FIG. 12A) of the MEMS mirror around its vertical axis is used to tune the specific wavelength $\lambda_i$ that is sent to the OUT fiber, similar to the tuning action shown in FIG. 5A.

FIGS. 13A and 13B provide cross-section views of an additional embodiment of the present invention, similar to the embodiment shown in FIGS. 12A and 12B, except that the third fiber has been added as an additional output fiber. In this embodiment the second tilt axis of the 3-D MEMS mirror can be used to direct the tuned wavelength $\lambda_i$ to one of two output fibers. The tunable optical filter is therefore also combining the function of a 1×2 optical switch. Optical components 1301, 1302, 1303, 1304, 1305, 1306, 1307 and 1308 perform substantially the same functions as those of 501, 502, 503, 504, 505, 506, 507 and 508 of FIGS. 5A and 5B respectively. The operation of the embodiment shown in FIGS. 13A and 13B is similar to the operation of the embodiment shown in FIGS. 5A and 5B, as described above. The tuning action of the MEMS mirror, as shown in the Top View of FIG. 13A, is essentially unchanged. In the Side View of FIG. 13B, however, the tilt angle (indicated by the curved arrow in block 1307 in FIG. 13B) of the MEMS mirror around its horizontal axis determines whether the optical signal coming in on the IN fiber is directed to the OUT1 fiber (the optical path shown as a solid line), or if the optical signal coming in on the IN fiber is directed to the OUT2 fiber (the optical path shown as a dashed line). The mirror 1306 is a 3-D MEMS mirror, and voltage control circuit 1308 may be used to cause tilt about the horizontal axis. In either case, the tilt angle (indicated by the curved arrow in block 1307 in FIG. 13A) of the MEMS mirror around its vertical axis is used to tune the specific wavelength $\lambda_i$ that is sent to either the OUT1 fiber or the OUT2 fiber, similar to the tuning action shown in FIG. 5A.

The embodiments shown in FIGS. 12A, 12B and 13A, 13B may have application in optical communication networks that make use of redundant paths, redundant network elements, and/or protection switching, for greater network reliability.

The invention claimed is:

1. A tunable optical filter device, comprising:
   at least one diffraction element that diffracts light of multiple wavelengths into different wavelength components;
   a single light reflector that reflects all of said wavelength components from the at least one element towards the at least one element so that light is diffracted a first and a second time only by one element of said at least one element in an optical path between one of at least one input port and one of at least one output port in a manner so that a dispersion angle of the wavelength components after the second diffraction by said one element is larger than that caused by the first diffraction by said at least one element; and
   an actuator that moves the reflector so that a selected one or selected ones of said wavelength components will pass from said one input port to said one output port.

2. The device of claim 1, said at least one diffraction element comprising a diffraction grating that reflects or transmits light.

3. The device of claim 1, wherein said actuator moves the reflector by rotating it.

4. The device of claim 3, wherein said actuator rotates the reflector along two different axes.

5. The device of claim 4, wherein said actuator rotates the reflector along a first one of the two different axes to select from said different wavelength components, at least one wavelength component that is passed from said one input port to said one output port, and rotates the reflector along a second one of the two different axes to align the optical path between said one input port and said one output port.

6. The device of claim 1, said device comprising at least two diffraction elements in said optical path, wherein said reflector reflects light from the elements towards the elements so that light is diffracted and dispersed twice by at least one of said at least two elements between said one input port and said one output port.

7. The device of claim 6, wherein light is diffracted and dispersed twice by each of said at least two elements between said one input port and said one output port.

8. The device of claim 1, further comprising a quarter wave plate in said optical path.

9. The device of claim 1, further comprising a beam size conversion element in said optical path.

10. A filtering method, comprising:
    providing at least one diffraction element that diffracts light of multiple wavelengths into different wavelength components;
    reflecting said wavelength components from the at least one element towards the at least one element so that said wavelength components are diffracted a first and a second time only by one element of said at least one element in an optical path between at least one input port and at least one output port in a manner so that a dispersion angle of the wavelength components after the second diffraction by said at least one element is larger than that caused by the first diffraction by said at least one element; and
    altering an angle of reflection of the light towards the at least one element so that at least one selected wavelength component of said wavelength components will pass from one of said at least one input port to one of said at least one output port.

11. The method of claim 10, wherein said altering causes said at least selected one wavelength component to pass from a selected one of two optical input ports to an optical output port.

12. The method of claim 10, wherein said altering causes said at least one selected wavelength component to pass from an optical input port to a selected one of two output ports.

13. The method of claim 10, further comprising detecting said at least one selected wavelength component.

14. The method of claim 10, wherein said altering comprises rotating a reflector.

15. The method of claim 10, wherein said reflecting reflects light towards at least two diffraction elements, so that light is diffracted and dispersed only twice by at least one of said at least two elements between said at least one input port and said at least one output port.

16. The method of claim 15, wherein light is diffracted and dispersed only twice by each of said at least two elements between said at least one input port and said at least one output port.

17. A filtering method, comprising:
    providing at least one diffraction element that diffracts light of multiple wavelengths into different wavelength components;
    reflecting said wavelength components from the at least one element towards the at least one element so that said wavelength components are diffracted at least twice by one element of said at least one element in an optical path between at least one input port and at least one output port; and altering an angle of reflection of the light towards the at least one element by rotating a single reflector along a single axis, so that at least one selected wavelength component of said wavelength components will pass from one of said at least one input port to one of said at least one output port, wherein said rotation of the reflector along said single axis is adequate for causing said at least one selected wavelength component of said wavelength components to pass from said one of said at least one input port to said one of said at least one output port, wherein a dispersion angle of the wavelength components after the second diffraction by said one element is larger than that caused by the first diffraction by said one element.

* * * * *

(12) EX PARTE REEXAMINATION CERTIFICATE (9279th)
United States Patent
Ye et al.

(10) Number: US 7,899,330 C1
(45) Certificate Issued: Sep. 4, 2012

(54) COMPACT HIGH-RESOLUTION TUNABLE OPTICAL FILTER USING OPTICAL DIFFRACTION ELEMENT AND A MIRROR

(75) Inventors: Feng Ye, Alameda, CA (US); Ho-Shang Lee, El Sobrante, CA (US); Robert Schleicher, Danville, CA (US)

(73) Assignee: Dicon Fiberoptics, Inc., Richmond, CA (US)

Reexamination Request:
No. 90/012,014, Nov. 18, 2011

Reexamination Certificate for:
Patent No.: 7,899,330
Issued: Mar. 1, 2011
Appl. No.: 11/625,253
Filed: Jan. 19, 2007

Related U.S. Application Data

(60) Provisional application No. 60/849,343, filed on Oct. 4, 2006.

(51) Int. Cl.
*H04J 14/02* (2006.01)

(52) U.S. Cl. ............................... 398/85; 398/79; 398/82; 398/83; 398/87; 385/24; 385/33; 385/37

(58) Field of Classification Search ....................... None
See application file for complete search history.

(56) References Cited

To view the complete listing of prior art documents cited during the proceeding for Reexamination Control Number 90/012,014, please refer to the USPTO's public Patent Application Information Retrieval (PAIR) system under the Display References tab.

*Primary Examiner* — Minh Dieu Nguyen

(57) ABSTRACT

At least one diffraction element is used to diffract light of multiple wavelengths into different wavelength components. Instead of moving the diffraction element as in certain prior filters, light from the at least one element is reflected back towards the at least one element so that light is diffracted at least twice by the at least one element. The reflection is such that at least one selected wavelength component of said wavelength components will pass from an input port to an output port or to another device.

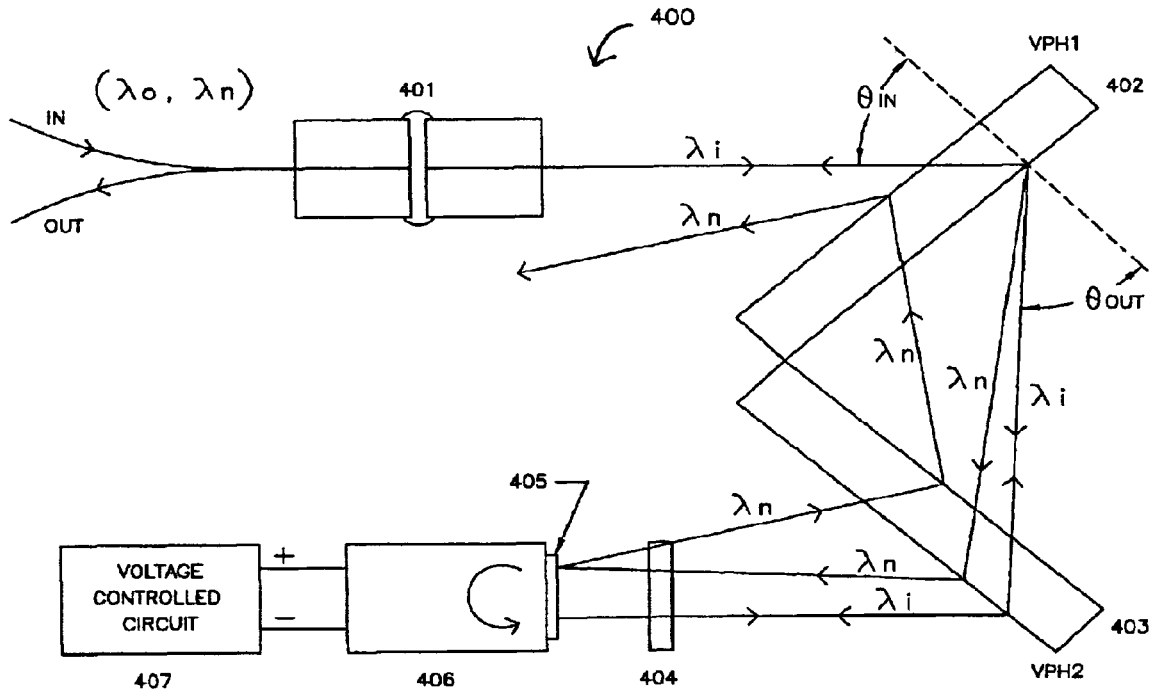

US 7,899,330 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 9 is cancelled.

Claims 1, 10, 14 and 17 are determined to be patentable as amended.

Claims 2-8, 11-13 and 15-16, dependent on an amended claim, are determined to be patentable.

New claims 18-25 are added and determined to be patentable.

1. A tunable optical filter device, comprising:
   *a collimator that collimates light of multiple wavelengths into a collimated light beam;*
   at least one diffraction element that diffracts *the collimated* light *beam* of multiple wavelengths into different wavelength components;
   a single *Micro-Electro-Mechanical System (MEMS)* light reflector that *has a surface area that* reflects all of said wavelength components from the at least one element towards the at least one element so that light is diffracted a first and a second time only by one element of said at least one element in an optical path between one of at least one input port and one of at least one output port in a manner so that a dispersion angle of the wavelength components after the second diffraction by said one element is larger than that caused by the first diffraction by said at least one element; [and]
   an actuator that moves the reflector so that a selected one or selected ones of said wavelength components will pass from said one input port to said one output port; *and*
   *a beam-size conversion element located in an optical path between the at least one diffraction element and the single MEMS light reflector, said element reducing a beam size of the collimated light beam after the collimated light beam has been diffracted the first time to match the size of the MEMS light reflector surface area before said light of multiple wavelengths reaches said single MEMS light reflector.*

10. A filtering method, comprising:
    *collimating light of multiple wavelengths from an optical fiber into a collimated light beam;*
    providing at least one diffraction element that diffracts *the collimated* light *beam* of multiple wavelengths into different wavelength components;
    reflecting *from a surface area of a single Micro-Electro-Mechanical System (MEMS) light reflector* said wavelength components from the at least one element towards the at least one element so that said wavelength components are diffracted a first and a second time only by one element of said at least one element in an optical path between at least one input port and at least one output port in a manner so that a dispersion angle of the wavelength components after the second diffraction by said at least one element is larger than that caused by the first diffraction by said at least one element; [and]
    altering an angle of reflection of the light towards the at least one element so that at least one selected wavelength component of said wavelength components will pass from one of said at least one input port to one of said at least one output port; *and*
    *reducing a beam size of the collimated light beam after the collimated light beam has been diffracted the first time to match the size of the MEMS light reflector surface area before said light of multiple wavelengths reaches said single MEMS light reflector.*

14. The method of claim 10, wherein said altering comprises rotating [a] *the* MEMS light reflector *using a MEMS actuator that holds the MEMS light reflector*.

17. A filtering method, comprising:
    *collimating light of multiple wavelengths from an optical fiber into a collimated light beam;*
    providing at least one diffraction element that diffracts *the collimated* light *beam* of multiple wavelengths into different wavelength components;
    reflecting *from a surface area of a single Micro-Electro-Mechanical System (MEMS) light reflector* said wavelength components from the at least one element towards the at least one element so that said wavelength components are diffracted at least twice by one element of said at least one element in an optical path between at least one input port and at least one output port; [and]
    altering an angle of reflection of the light towards the at least one element by rotating [a] *said* single *MEMS light* reflector along a single axis, so that at least one selected wavelength component of said wavelength components will pass from one of said at least one input port to one of said at least one output port, wherein said rotation of the *single MEMS light* reflector along said single axis is adequate for causing said at least one selected wavelength component of said wavelength components to pass from said one of said at least one input port to said one of said at least one output port, wherein a dispersion angle of the wavelength components after the second diffraction by said one element is larger than that caused by the first diffraction by said one element; *and*
    *reducing a beam size of the collimated light beam after the collimated light beam has been diffracted to match the size of the MEMS light reflector surface area before said light of multiple wavelengths reaches said single MEMS light reflector.*

18. *The tunable optical filter device of claim 1, said actuator comprising electrodes and a voltage control circuit that provides voltages to the electrodes for repeatably determining tilt angles of the MEMS light reflector about at least one tilt axis of the MEMS light reflector.*

19. *The tunable optical filter device of claim 1, said actuator being a MEMS actuator that holds or is attached to the MEMS light reflector, said MEMS actuator tilting said MEMS light reflector in response to said voltages.*

20. *The tunable optical filter device of claim 1, further comprising one or more non-ductile torsion beams that support said MEMS light reflector so that a tilt angle versus applied voltage characteristic of the MEMS light reflector is highly repeatable.*

21. The tunable optical filter device of claim 20, said one or more non-ductile torsion beams comprising at least one single-crystalline silicon beam.

22. The filtering method of claim 10, further comprising providing voltages that repeatably determine tilt angles of the MEMS light reflector about a tilt axis of the MEMS light reflector.

23. The filtering method of claim 17, further comprising providing voltages to a MEMS actuator that repeatably determine tilt angles of the MEMS light reflector about a tilt axis of the MEMS light reflector.

24. The tunable optical filter device of claim 1, said beam-size conversion element comprising two lenses with different focal lengths $f$ and $F$, wherein the element reduces beam size of the collimated light beam by a ratio of $f/F$ when said light of multiple wavelengths reaches said single MEMS light reflector.

25. The tunable optical filter device of claim 1, said actuator further comprising electrodes and a voltage control circuit that provides a controlled voltage to the electrodes to determine an angle position of the MEMS light reflector about at least one tilt axis of the MEMS light reflector.

* * * * *